(12) United States Patent
Liu et al.

(10) Patent No.: US 11,601,311 B2
(45) Date of Patent: Mar. 7, 2023

(54) UPLINK TRANSMISSION WAVEFORM CONFIGURATION METHOD, BASE STATION, AND USER EQUIPMENT

(71) Applicants: SHARP KABUSHIKI KAISHA, Sakai (JP); FG Innovation Company Limited, Tuen Mun (HK)

(72) Inventors: Renmao Liu, Shanghai (CN); Fangying Xiao, Shanghai (CN)

(73) Assignees: SHARP KABUSHIKI KAISHA, Sakai (JP); Sharp Corporation, Sakai (JP)

( * ) Notice: Subject to any disclaimer, the term of this patent is extended or adjusted under 35 U.S.C. 154(b) by 0 days.

(21) Appl. No.: 16/346,093

(22) PCT Filed: Nov. 2, 2017

(86) PCT No.: PCT/CN2017/109064
§ 371 (c)(1),
(2) Date: Apr. 29, 2019

(87) PCT Pub. No.: WO2018/082600
PCT Pub. Date: May 11, 2018

(65) Prior Publication Data
US 2019/0297619 A1    Sep. 26, 2019

(30) Foreign Application Priority Data

Nov. 4, 2016   (CN) .......................... 201610974392.0

(51) Int. Cl.
*H04W 72/04*      (2009.01)
*H04W 74/08*      (2009.01)
(Continued)

(52) U.S. Cl.
CPC ............ *H04L 27/2602* (2013.01); *H04L 5/00* (2013.01); *H04L 27/26* (2013.01);
(Continued)

(58) Field of Classification Search
CPC . H04W 72/0413; H04W 72/12; H04W 72/04; H04W 88/08; H04W 88/023;
(Continued)

(56) References Cited

U.S. PATENT DOCUMENTS

2012/0147831 A1    6/2012  Golitschek
2014/0153452 A1*   6/2014  Son .......................... H04L 5/001
                                                                370/280

(Continued)

FOREIGN PATENT DOCUMENTS

CN          105306172 A    2/2016
CO       2020/0013515 A2   11/2020
(Continued)

OTHER PUBLICATIONS

U.S. Appl. No. 62/413,314, filed Oct. 26, 2016.
(Continued)

*Primary Examiner* — Un C Cho
*Assistant Examiner* — Lalita W Pace
(74) *Attorney, Agent, or Firm* — ScienBiziP, P.C.

(57) ABSTRACT

Provided is a base station, comprising: a configuration unit, configured to configure a transmission waveform of a User Equipment (UE) for uplink transmission; and a transmission unit, configured to transmit information related to the configuration to the UE. The configuration unit is configured by using any of the following modes: physical layer signaling, a Random Access Response (RAR) message of Media Access Control (MAC), and Radio Resource Control (RRC) signaling. The present application also provides a user equipment (UE) and a corresponding method.

4 Claims, 6 Drawing Sheets

(51) Int. Cl.

| | | |
|---|---|---|
| *H04L 27/26* | (2006.01) | |
| *H04W 76/27* | (2018.01) | |
| *H04W 80/02* | (2009.01) | |
| *H04W 88/02* | (2009.01) | |
| *H04W 88/08* | (2009.01) | |
| *H04L 5/00* | (2006.01) | |
| *H04W 72/12* | (2023.01) | |

(52) U.S. Cl.
CPC ......... *H04L 27/2607* (2013.01); *H04W 72/04* (2013.01); *H04W 72/042* (2013.01); *H04W 72/0413* (2013.01); *H04W 72/12* (2013.01); *H04W 74/0833* (2013.01); *H04W 76/27* (2018.02); *H04W 80/02* (2013.01); *H04W 88/023* (2013.01); *H04W 88/08* (2013.01); *H04L 5/0007* (2013.01); *H04L 5/0044* (2013.01); *H04L 27/2636* (2013.01)

(58) Field of Classification Search
CPC ............. H04W 80/02; H04W 74/0833; H04W 72/042; H04W 76/27; H04W 72/1289; H04W 74/002; H04W 74/006; H04W 74/008; H04L 27/26; H04L 5/00; H04L 27/2607; H04L 5/0007; H04L 27/2601; H04L 5/0053
See application file for complete search history.

(56) References Cited

U.S. PATENT DOCUMENTS

| | | | |
|---|---|---|---|
| 2017/0353912 A1 | 12/2017 | Einhaus et al. | |
| 2018/0049173 A1* | 2/2018 | Chen ................... | H04W 72/044 |
| 2018/0092086 A1* | 3/2018 | Nammi ............. | H04W 72/0433 |
| 2018/0116000 A1* | 4/2018 | Ly ....................... | H04W 74/006 |
| 2018/0124710 A1* | 5/2018 | Ly ............................ | H04L 1/00 |
| 2019/0182811 A1 | 6/2019 | Xu | |
| 2019/0182812 A1* | 6/2019 | Shimezawa .......... | H04B 7/0697 |
| 2019/0222348 A1 | 7/2019 | Zhang | |
| 2019/0253122 A1* | 8/2019 | Yang .................... | H04B 7/0639 |
| 2019/0261284 A1* | 8/2019 | Moroga ................. | H04W 8/24 |
| 2019/0261397 A1* | 8/2019 | Takeda ................. | H04L 5/0053 |
| 2020/0252179 A1 | 8/2020 | Kim et al. | |
| 2021/0152211 A1 | 5/2021 | Matsumura et al. | |

FOREIGN PATENT DOCUMENTS

| | | |
|---|---|---|
| JP | 6583746 B2 | 10/2019 |
| WO | 2008/024788 A2 | 2/2008 |
| WO | 2016/004634 A1 | 1/2016 |
| WO | 2016/071021 A1 | 5/2016 |

OTHER PUBLICATIONS

Panasonic, "NR waveform evaluation and proposals", R1-167337, 3GPP TSG RAN WG1 Meeting #86, Gothenburg, Sweden, Aug. 22-26, 2016.

Guangdong Oppo Mobile Telecom, "Waveform selection for uplink control signal", R1-1611705, 3GPP TSG RAN WG1 Meeting #87, Reno, USA, Nov. 14-18, 2016.

NTT Docomo, "New SID Proposal: Study on New Radio Access Technology", RP-160671, 3GPP TSG RAN Meeting #71, Göteborg, Sweden, 7.-10. Mar. 2016.

Qualcomm Incorporated, "Phase 1 waveform proposal: CP-OFDM plus DFT-S-OFDM", R1-1610111, 3GPP TSG-RAN WG1 #86 Oct. 10-14, 2016 Lisbon, Portugal.

Qualcomm Incorporated, "User Multiplexing of DFTs-OFDM and OFDM in uplink", R1-1610114, 3GPP TSG-RAN WG1 #86 Oct. 10-14, 2016 Lisbon, Portugal.

Qualcomm et al., "WF on Waveform for NR Uplink", R1-1610485, 3GPP TSG RAN WG1 #86-Bis Lisbon, Portugal Oct. 10-14, 2016.

* cited by examiner

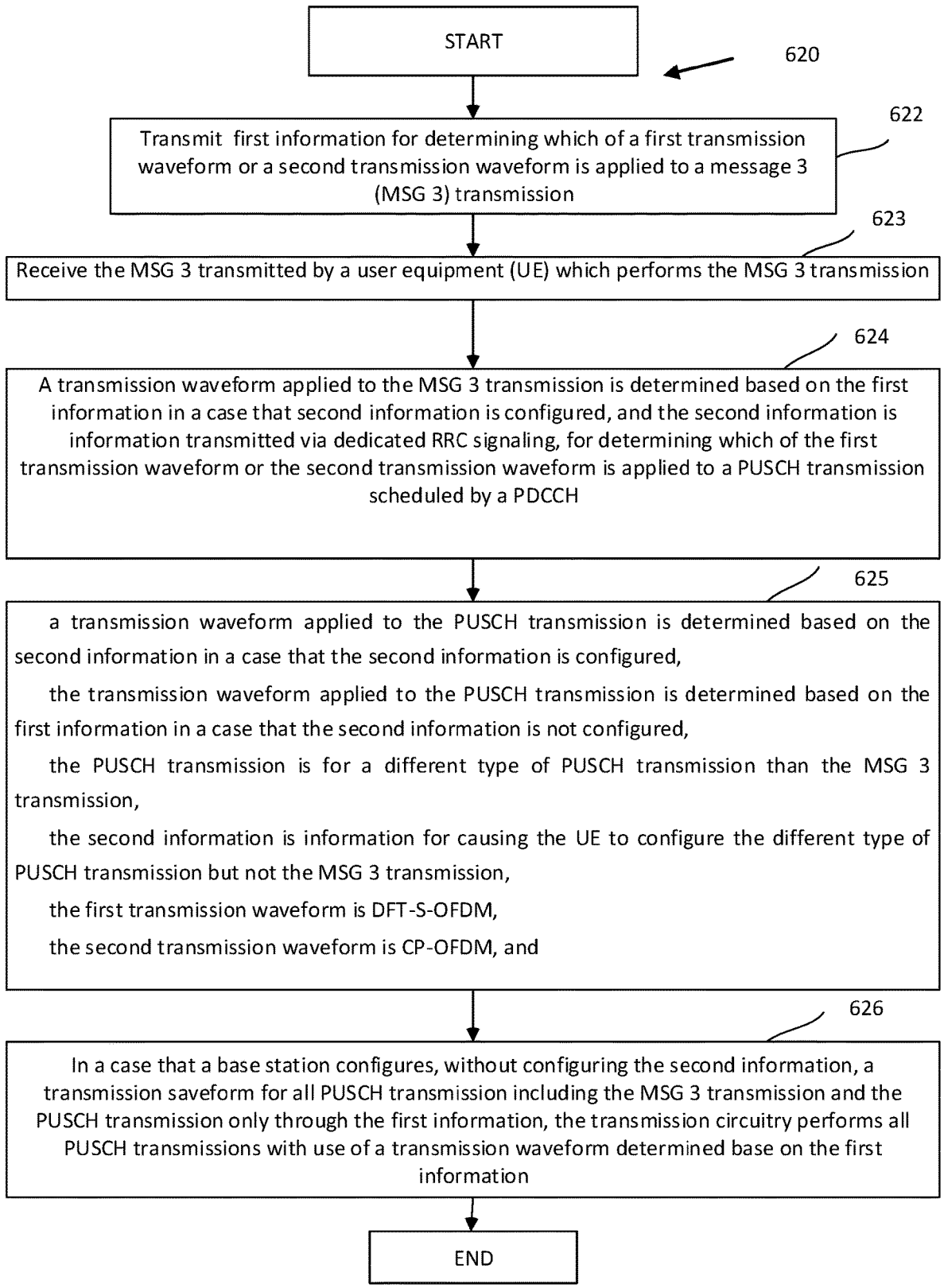

UPLINK TRANSMISSION WAVEFORM CONFIGURATION METHOD, BASE STATION, AND USER EQUIPMENT

TECHNICAL FIELD

The present application relates to the technical field of wireless communication. More specifically, the present application relates to an uplink transmission waveform configuration method, a base station, and a user equipment (UE).

BACKGROUND

A new research project on 5G technical standards (see non-patent literature: RP-160671: New SID Proposal: Study on New Radio Access Technology) was proposed by NTT DOCOMO in the 3rd Generation Partnership Project (3GPP) RAN #71 plenary session held in March 2016, and was approved. The goal of the research project is to develop a New Radio (NR) access technology to meet all of the usage scenarios, requirements, and deployment environments of 5G. NR mainly has three usage scenarios: Enhanced Mobile Broadband Communication (eMBB), massive Machine Type Communication (mMTC), and Ultra Reliable and Low Latency Communications (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

At the 3GPP RAN1. #86bis meeting held in Lisbon in October, 2016, the RAN1 working group agreed on the use of Discrete Fourier Transform-Spreading-Orthogonal Frequency Division Multiplexing (DFT-S-OFDM) and Cyclic Prefix-Orthogonal Frequency Division Multiplexing (CP-OFDM) for uplink transmission of NR. Furthermore, an NR UE must be enforced to support the above two transmission waveforms. However, since an uplink of an existing LTE UE supports only one type of transmission waveform: DFT-S-OFDM, an eNB receives, only in accordance with the DFT-S-OFDM waveform, data transmitted by the UE. When the uplink supports two types of waveforms, prior to receiving a physical channel, the eNB has to know which type of waveform the UE sends the physical channel with; otherwise, it would be difficult for the eNB to accomplish the receiving of the uplink.

SUMMARY OF INVENTION

According to one aspect of the present application, a base station is provided. The base station comprises: a configuration unit, configured to configure a transmission waveform of a User Equipment (UE) for uplink transmission; and a transmission unit, configured to transmit information related to the configuration to the UE; wherein the configuration unit performs the configuration by using any of the following modes: physical layer signaling, a Media Access Control (MAC) Random Access Response (RAR) message, and Radio Resource Control (RRC) signaling.

In one embodiment, the transmission waveform comprises a Discrete Fourier Transform-Spreading-Orthogonal Frequency Division Multiplexing (DFT-S-OFDM) waveform and a Cyclic Prefix-Orthogonal Frequency Division Multiplexing (CP-OFDM) waveform.

In one embodiment, the configuration unit is configured to configure the transmission waveform of the UE for uplink transmission through physical layer signaling, the physical layer signaling comprising Downlink Control Information (DCI).

In one embodiment, the DCI comprises information indicating a transmission waveform adopted in uplink transmission of the UE, or resource allocation information for uplink transmission of the UE.

In one embodiment, the configuration unit is configured to configure the transmission waveform of the UE for uplink transmission through a MAC RAR message, the MAC RAR message comprising an uplink scheduling grant indicating a transmission waveform adopted for a random access message 3 and/or a subsequent Physical Uplink Shared Channel (PUSCH).

In one embodiment, the configuration unit is configured to reconfigure a transmission waveform of the UE for a PUSCH through RRC signaling dedicated to the UE after the UE enters an RRC connected state.

In one embodiment, the configuration unit is configured to predefine a transmission waveform of the UE for transmitting a random access message 3 and/or a subsequent PUSCH.

In one embodiment, the configuration unit is configured to reconfigure a transmission waveform of the UE for a PUSCH through RRC signaling dedicated to the UE after the UE enters an RRC connected state.

In one embodiment, the configuration unit is configured to receive a random access message 1 from the UE, so as to determine the transmission waveform of the UE for uplink transmission.

In one embodiment, the configuration unit is configured to predetermine a transmission waveform adopted in uplink transmission of resources in each resource pool for uplink transmission of the UE.

According to another aspect of the present application, a method in a base station is provided. The method comprises: configuring a transmission waveform of a UE for uplink transmission; and transmitting information related to the configuration to the UE; wherein the configuration is performed by using any of the following modes: physical layer signaling, an MAC RAR message, and RRC signaling.

In one embodiment, the transmission waveform comprises a DFT-S-OFDM waveform and a CP-OFDM waveform.

In one embodiment, the transmission waveform of the UE for uplink transmission is configured through physical layer signaling, the physical layer signaling comprising DCI.

In one embodiment, the DCI comprises information indicating a transmission waveform adopted in uplink transmission of the UE, or resource allocation information for uplink transmission of the UE.

In one embodiment, the transmission waveform of the UE for uplink transmission is configured through a MAC RAR message, the MAC RAR message comprising an uplink scheduling grant indicating a transmission waveform adopted for a random access message 3 and/or a subsequent PUSCH.

In one embodiment, a transmission waveform of the UE for a PUSCH is reconfigured through RRC signaling dedicated to the UE after the UE enters an RRC connected state.

In one embodiment, a transmission waveform of the UE for transmitting a random access message 3 and/or a subsequent PUSCH is predefined.

In one embodiment, a transmission waveform of the UE for a PUSCH is reconfigured through RRC signaling dedicated to the UE after the UE enters an RRC connected state.

In one embodiment, a random access message 1 is received from the UE, so as to determine the transmission waveform of the UE for uplink transmission.

In one embodiment, a transmission waveform adopted in uplink transmission of resources in each resource pool for uplink transmission of the UE is predetermined.

According to another aspect of the present application, a UE is provided. The UE comprises: a receiving unit, configured to receive configuration information about a transmission waveform of the UE for uplink transmission from a base station; and an extraction unit, configured to extract a configuration of the transmission waveform of the UE for uplink transmission from the received information; wherein the receiving unit receives the configuration information through any of the following modes: physical layer signaling, an MAC RAR message, and RRC signaling.

In one embodiment, the transmission waveform comprises a DFT-S-OFDM waveform and a CP-OFDM waveform.

In one embodiment, the transmission waveform of the UE for uplink transmission is configured through physical layer signaling, the physical layer signaling comprising DCI.

In one embodiment, the DCI comprises information indicating a transmission waveform adopted in uplink transmission of the UE, or resource allocation information for uplink transmission of the UE.

In one embodiment, the transmission waveform of the UE for uplink transmission is configured through a MAC RAR message, the MAC RAR message comprising an uplink scheduling grant indicating a transmission waveform adopted for a random access message 3 and/or a subsequent PUSCH.

In one embodiment, a transmission waveform of the UE for a PUSCH is reconfigured through RRC signaling dedicated to the UE after the UE enters an RRC connected state.

In one embodiment, a transmission waveform of the UE for transmitting a random access message 3 and/or a subsequent PUSCH is predefined.

In one embodiment, a transmission waveform of the UE for a PUSCH is reconfigured through RRC signaling dedicated to the UE after the UE enters an RRC connected state.

In one embodiment, the UE transmits a random access message 1 to the base station, so as to determine the transmission waveform of the UE for uplink transmission.

In one embodiment, a transmission waveform adopted in uplink transmission of resources in each resource pool for uplink transmission of the UE is predetermined.

According to another aspect of the present application, a method in a UE is provided. The method comprises: receiving configuration information about a transmission waveform of the UE for uplink transmission from a base station; and extracting a configuration of the transmission waveform of the UE for uplink transmission from the received information; wherein the configuration information is received through any of the following modes: physical layer signaling, an MAC RAR message, and RRC signaling.

In one embodiment, the transmission waveform comprises a DFT-S-OFDM waveform and a CP-OFDM waveform.

In one embodiment, the transmission waveform of the UE for uplink transmission is configured through physical layer signaling, the physical layer signaling comprising DCI.

In one embodiment, the DCI comprises information indicating a transmission waveform adopted in uplink transmission of the UE, or resource allocation information for uplink transmission of the UE.

In one embodiment, the transmission waveform of the UE for uplink transmission is configured through a MAC RAR message, the MAC RAR message comprising an uplink scheduling grant indicating a transmission waveform adopted for a random access message 3 and/or a subsequent PUSCH.

In one embodiment, a transmission waveform of the UE for a PUSCH is reconfigured through RRC signaling dedicated to the UE after the UE enters an RRC connected state.

In one embodiment, a transmission waveform of the UE for transmitting a random access message 3 and/or a subsequent PUSCH is predefined.

In one embodiment, a transmission waveform of the UE for a PUSCH is reconfigured through RRC signaling dedicated to the UE after the VP enters an RRC connected state.

In one embodiment, the UE transmits a random access message 1 to the base station, so as to determine the transmission waveform of the UE for uplink transmission.

In one embodiment, a transmission waveform adopted in uplink transmission of resources in each resource pool for uplink transmission of the UE is predetermined.

BRIEF DESCRIPTION OF DRAWINGS

The above and other features of the present application will become more apparent through the following detailed description made in conjunction with the accompanying drawings, where:

FIG. 6 is a flowchart of a method of transmitting first information.

DETAILED DESCRIPTION OF EMBODIMENTS

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms included in the present application are described below. Unless otherwise stated, the terms included in the present application are used as defined herein. In addition, the present application is illustrated by taking LTE, eLTE, and NR as examples. It should be noted that the present application is not limited to the LTE, eLTE, and NR. Instead, the present application is also applicable to other wireless communication systems, for example, a GG wireless communication system.

In the present application, a physical uplink channel refers to a physical uplink shared channel and/or physical uplink control channel, or a physical uplink data channel or physical uplink control channel for bearing uplink data and/or signaling of a UE as defined by NR.

In the present application, a transmission waveform of a UE for uplink transmission refers to a generation mode of an uplink communication signal, which can comprise DFT-S-OFDM and CP-OFDM or other generation modes for generating an uplink communication signal as defined by NR.

Figure 1:
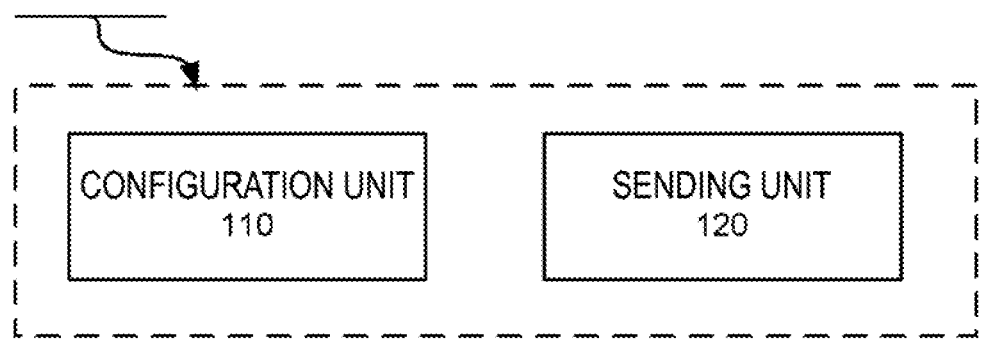
FIG. 1 is a block diagram of a base station according to an embodiment of the present application.

FIG. 1 illustrates a block diagram of a base station 100 according to an embodiment of the present application. As shown in FIG. 1, the base station 100 comprises a configuration unit 110 and a transmission unit 120. Those skilled in the art should understand that the base station 100 may also include other functional units needed for implementing its functions, such as various processors, memories, RF signal processing units, baseband signal processing units, and other physical downlink channel transmission processing units. However, for simplicity, a detailed description of these well-known elements is omitted.

The configuration unit 110 configures a waveform of a UE for uplink transmission. For example, the configuration unit 110 performs the configuration by using any of the following modes: physical layer signaling, an MAC RAR message, and RRC signaling. The transmission unit 120 transmits information related to the configuration to the UE.

In the present application, the transmission waveform can comprise a DFT-S-OFDM waveform and a CP-OFDM waveform or other uplink communication signal generation modes defined in other ways.

Alternatively, the configuration unit 110 can configure the transmission waveform of the UE 200 for uplink transmission through physical layer signaling, the physical layer signaling comprising DCI. The DCI can comprise information indicating a transmission waveform adopted in uplink transmission of the UE 200, or resource allocation information for uplink transmission of the UE 200.

Alternatively, the configuration unit 110 can configure the transmission waveform of the UE 200 for uplink transmission through a MAC RAR message, the MAC RAR message comprising an uplink scheduling grant indicating a transmission waveform adopted for a random access message 3 and/or a subsequent PUSCH. Further, the configuration unit 110 reconfigures a transmission waveform of the UE 200 for a PUSCH through RRC signaling dedicated to the UE 200 after the UE 200 enters an RRC connected state.

Alternatively, the configuration unit 110 predefines a transmission waveform of the UE 200 for transmitting the random access message 3 and/or the subsequent PUSCH. Further, the configuration unit 110 reconfigures a transmission waveform of the UE 200 for a PUSCH through RRC signaling dedicated to the UE 200 after the UE 200 enters an RRC connected state.

Alternatively, the configuration unit 110 can receive a random access message 1 from the UE 200, so as to determine the transmission waveform of the UE 200 for uplink transmission.

Alternatively, the configuration unit 110 can predetermine a transmission waveform adopted in uplink transmission of resources in each resource pool for uplink transmission of the UE 200.

Figure 2:
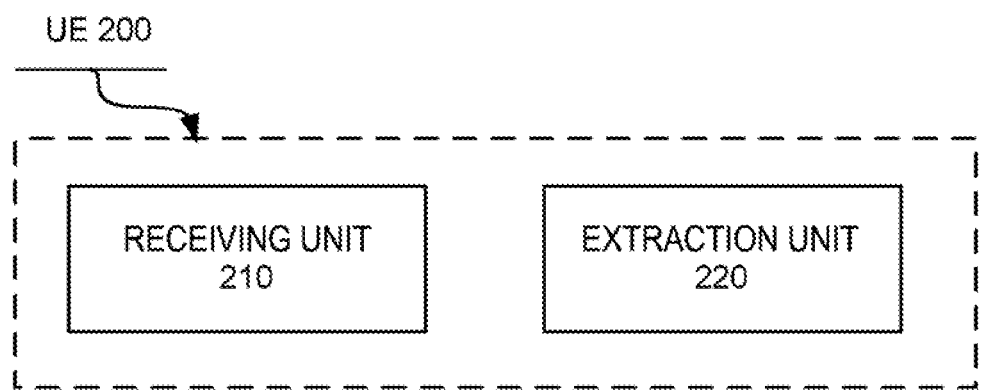
FIG. 2 is a block diagram of a user equipment according to an embodiment of the present application.

FIG. 2 is a block diagram of the UE 200 according to an embodiment of the present application. As shown in FIG. 2, the UE 200 comprises a receiving unit 210 and an extraction unit 220. Those skilled in the art should understand that the UE 200 can also comprise other functional units needed for implementing its functions, such as various processors, memories, RF signal processing units, baseband signal processing units, and other physical uplink channel transmission processing units. However, for simplicity, a detailed description of these well-known elements is omitted.

The receiving unit 210 receives configuration information about a transmission waveform of the UE for uplink transmission from a base station. The extraction unit 220 extracts a configuration of the transmission waveform of the UE for uplink transmission from the received information. Herein, the receiving unit 210 can receive the configuration information by using any of the following modes: physical layer signaling, an MAC RAR message, and RRC signaling.

In the present application, the transmission waveform can comprise a DFT-S-OFDM waveform and a CP-OFDM waveform or other uplink communication signal generation modes defined in other ways.

Alternatively, the transmission waveform of the UE 200 for uplink transmission is configured through physical layer signaling, the physical layer signaling comprising DCI. The DCI can comprise information indicating a transmission waveform adopted in uplink transmission of the UE 200, or resource allocation information for uplink transmission of the UE 200.

Alternatively, the transmission waveform of the UE 200 for uplink transmission is configured through a MAC RAR message, the MAC RAR message comprising an uplink scheduling grant indicating a transmission waveform adopted for a random access message 3 and/or a subsequent PUSCH. A transmission waveform of the UE 200 for a PUSCH is reconfigured through RRC signaling dedicated to the UE 200 after the UE 200 enters an RRC connected state.

Alternatively, a transmission waveform of the UE 200 for transmitting the random access message 3 and/or the subsequent PUSCH is predefined. The transmission waveform of the UE 200 for the PUSCH is reconfigured through the RRC signaling dedicated to the UE 200 after the UE 200 enters the RRC connected state.

Alternatively, the transmission waveform of the UE 200 for uplink transmission can be determined by transmitting a random access message 1 to a base station.

Alternatively, a transmission waveform adopted in uplink transmission of resources in each resource pool for uplink transmission of the UE 200 is predetermined.

The operations of the base station 100 and the UE 200 are described below by using some specific embodiments.

Embodiment 1

In this embodiment, the base station 100 utilizes physical layer signaling to configure or distinguish a waveform used by the UE to transmit a physical uplink channel.

Mode 1

The configuration unit 110 of the base station 100 can dynamically indicate, through DCI, a waveform used by the UE to transmit a physical uplink channel. The physical uplink channel mainly refers to a Physical Uplink Shared Channel (PUSCH). A PUSCH refers to a physical uplink shared channel in LTE/LTE-A specifications, or a physical uplink channel for bearing uplink data and/or signaling of a UE as defined by NR.

The uplink data and/or signaling transmitted by the UE 200 is scheduled through a Physical Downlink Control Channel (PDCCH). A PDCCH refers to a physical downlink control channel or an enhanced physical downlink control channel in LTE/LTE-A specifications, or a physical downlink control channel for scheduling a physical uplink channel that bears uplink data and/or signaling of a UE as defined by NR, For example, in LTE/LTE-A, DCI formats 0 and 4 can be used to schedule a PUSCH, In NR, a new DCI format can be defined for scheduling a PUSCH. A 1-bit information field can be defined in a DCI format to indicate a transmission waveform (e.g., DFT-S-OFDM or CP-OFDM) used by a UE to transmit a PUSCH. For example, "1" represents DFT-S-OFDM, and "0" represents CP-OFDM. In this way, whether a transmission waveform used by a scheduled PUSCH is DFT-S-OFDM or CP-OFDM can be dynamically indicated by DCI for scheduling the PUSCH.

The UE 200 can receive, through the receiving unit 210, the DCI for scheduling a PUSCH in a PDCCH, and extract, through the extraction unit 220, indication information about the transmission waveform used by the PUSCH that is scheduled by the DCI, the indication information being transmitted by the transmission unit 120 of the base station 100. The UE 200 then transmits a PUSCH by using the transmission waveform (DFT-S-OFDM or CP-OFDM) indicated by the base station 100.

Mode 2

The base station 100 can dynamically indicate a waveform used by the UE to transmit a physical uplink channel implicitly through resources allocated for a physical uplink channel that bears uplink data and/or signaling of the UE. The physical uplink channel mainly refers to a Physical Uplink Shared Channel (PUSCH). A PUSCH refers to a physical uplink shared channel in LTE/LTE-A specifications, or a physical uplink channel for bearing uplink data and/or signaling of a UE as defined by NR.

The uplink data and/or signaling transmitted by the UE 200 is scheduled through a Physical Downlink Control Channel (PDCCH). A PDCCH refers to a physical downlink control channel or an enhanced physical downlink control channel in LTE/LTE-A specifications, or a physical downlink control channel for scheduling a physical uplink channel that bears uplink data and/or signaling of a UE as defined by NR. In LTE/LTE-A, the base station 100 allocates resources for a PUSCH through DCI formats 0 and 4. In NR, a new DCI format can be defined to allocate resources for a PUSCH. The allocated resources are expressed by a RB (RB) or a RB pair. In the case of LTE/LTE-A, a RB refers to an area in two dimensions: time and frequency, i.e., 12 consecutive subcarriers in the frequency domain and 7 consecutive OFDM symbols in the time domain; furthermore, one RB pair comprises 2 RBs, so a RB pair refers to 12 consecutive subcarriers in the frequency domain and 14 consecutive OFDM symbols in the time domain. In the case of NR, the RB can refer to a resource allocation unit as defined in NR standards.

The base station 100 configures different operating frequency bands for different uplink transmission waveforms within an uplink system bandwidth through common RRC signaling. For example, the uplink system bandwidth is 100 RBs, and the base station 100 configures RBs numbered 0-49 as DFT-S-OFDM transmission waveforms and RBs numbered 50-99 as CP-OFDM transmission waveforms. The above-mentioned common RRC signaling can be a Master Information Block (MIB) and/or System Information Block (SIB) and/or other common RRC signaling defined in NR.

The base station 100 allocates resources for a PUSCH through a PDCCH; and the UE can be implicitly informed, through the allocated resources, of the transmission waveform adopted by the scheduled PUSCH. For example, if the resources allocated for the PUSCH by the base station 100 are among RBs numbered 0-49, then the UE is implicitly informed that the PUSCH is to be transmitted by using a DFT-S-OFDM waveform; otherwise, if the resources allocated for the PUSCH by the base station 100 are among RBs numbered 50-99, then the UE is implicitly informed that the PUSCH is to be transmitted by using a CP-OFDM waveform.

The receiving unit 210 of the UE 200 receives, through common RRC signaling, configuration information of different operating frequency bands configured for different uplink transmission waveforms by an eNB within an uplink system bandwidth. For example, the uplink system bandwidth is 100 RBs, the eNB configures RBs numbered 0-49 as DFT-S-OFDM transmission waveforms and RBs numbered 50-99 as CP-OFDM transmission waveforms. The above-mentioned common RRC signaling can be a Master Information Block (MIB) and/or System Information Block (SIB) and/or other common RRC signaling defined in NR.

By receiving the PDCCH, the UE 200 obtains the resources allocated by the base station 100 for its PUSCH; and the UE 200 can be implicitly informed, through the allocated resources, the transmission waveform adopted for transmitting the PUSCH at this time. For example, if the resources allocated for the PUSCH by the base station 100 which are obtained by the UE 200 are among RBs numbered 0-49, then the UE 200 is implicitly informed that the PUSCH is to be transmitted by using a DFT-S-OFDM waveform at this time; otherwise, if the resources allocated for the PUSCH by the base station 100 which are obtained by the UE 200 are among RBs numbered 50-99, then the UE 200 is implicitly informed that the PUSCH is to be transmitted by using a CP-OFDM waveform at this time.

Embodiment 2

In this embodiment, the base station 100 configures a transmission waveform for a random access message 3 (msg3) and its subsequent PUSCH through a MAC RAR.

After the UE 200 enters an RRC connected state, the base station 100 can reconfigure a transmission waveform for the PUSCH through RRC signaling dedicated to the UE 200. A PUSCH refers to a physical uplink shared channel in LTE/LTE-A specifications, or a physical uplink channel for bearing uplink data and/or signaling of the UE 200 as defined by NR.

The UE 200 needs to perform a random access process when switching from an idle state to the RRC connected state. The random access process mainly consists of a message 1 (msg1), a message 2 (msg2), a message 3 (msg3), and a message 4 (msg4). The msg1 is a preamble for the UE 200 to transmit random access on an uplink random access channel; the msg2 is a random access response message transmitted by the base station 100 on a downlink; and the msg3 is the first uplink transmission of the UE 200 on an uplink scheduled by the base station 100, the msg3 being borne by a PUSCH. The msg4 is a message transmitted by the base station 100 on a downlink for solving a conflict problem between different UEs 200 during the random access process.

As can be seen from the above, the msg3 is the first uplink transmission of the UE 200 scheduled by the base station 100 in a process of switching from the idle state to the RRC connected state. Before receiving the msg3, the base station 100 needs to know a transmission waveform (e.g., a DFT-S-OFDM waveform or a CP-OFDM waveform) used by the UE 200 to transmit a msg3. The base station 100 can configure a 1-bit information field in an uplink scheduling grant (UL-grant) of a MAC RAR to indicate a transmission waveform used by the UE 200 to transmit a msg3 and/or it subsequent PUSCH. For example, "1" indicates DFT-S-OFDM, and "0" indicates CP-OFDM. Alternatively, a 1-bit information field can be added in a message header (or a message sub-header) of a random access response to indicate a transmission waveform used by the UE 200 to transmit a msg3. For example, "1" indicates DFT-S-OFDM, and "0" indicates CP-OFDM.

After the UE 200 enters an RRC connected state, the base station 100 can reconfigure an uplink transmission waveform of the UE 200 through RRC signaling dedicated to the UE 200 according to a channel condition of the UE 200 and/or network traffic and/or other factors affecting the uplink transmission waveform of the UE 200.

The UE 200 entering an initial access process is taken as an example. Before the UE 200 enters the RRC connected state, the base station 100 configures, through the UL-grant of the MAC RAR, the transmission waveform used by the UE 200 to transmit the msg3 and/or the subsequent PUSCH. After the UE 200 enters the RRC connected state, the base station 100 determines whether there is a need to reconfigure the transmission waveform of the UE 200 for the PUSCH. If so, then the transmission waveform for the PUSCH is reconfigured through RRC signaling dedicated to the UE 200; and if not, then the base station 100 will not reconfigure the transmission waveform of the UE 200 for the PUSCH, that is, the UE 200 continues to transmit the PUSCH thereof by using a transmission waveform configured by a MAC RAR.

Alternatively, the base station 100 can configure the transmission waveform for the random access message 3 (msg3) and all of its subsequent PUSCHs only through a MAC RAR, rather than reconfiguring the transmission waveform of the UE 200 for the PUSCH through the RRC signaling dedicated to the UE 200 after the UE 200 enters the RRC connected state.

Alternatively, the UE 200 is predefined (or defined) to transmit a msg3 and/or its subsequent PUSCH by using a fixed transmission waveform before entering an RRC connected state. For example, the UE 200 is predefined to transmit a msg3 and/or its subsequent PUSCH by using only a DFT-SOFDM waveform before entering an RRC connected state. After the UE 200 enters an RRC connected state, the base station 100 can reconfigure an uplink transmission waveform of the UE 200 through RRC signaling dedicated to the UE 200 according to a channel condition of the UE 200 and/or network traffic and/or other factors affecting the uplink transmission waveform of the UE 200.

The UE 200 obtains configuration information of the transmission waveform for the random access message 3 (msg3) and its subsequent PUSCH through a MAC RAR. After the UE 200 enters an RRC connected state, the UE 200 obtains configuration information about a transmission waveform for a PUSCH through dedicated RRC signaling. A PUSCH refers to a physical uplink shared channel in LTE/LTE-A specifications, or a physical uplink channel for bearing uplink data and/or signaling of the UE 200 as defined by NR.

The UE 200 needs to perform a random access process when switching from an idle state to the RRC connected state. The random access process mainly consists of a message 1 (msg1), a message 2 (msg2), a message 3 (msg3), and a message 4 (msg4). The msg1 is a preamble for the UE 200 to transmit random access on an uplink random access channel; the msg2 is a random access response message transmitted by the base station 100 on a downlink; and the msg3 is the first uplink transmission of the UE 200 on an uplink scheduled by the base station 100, the msg3 being borne by a PUSCH. The msg4 is a message transmitted by the base station 100 on a downlink for solving a conflict problem between different UEs 200 during the random access process.

As can be seen from the above, the msg3 is the first uplink transmission of the UE 200 scheduled by the base station 100 in a process of switching from the idle state to the RRC connected state. Before transmitting a msg3, the UE 200 needs to know which type of waveform (e.g., a DFT-S-OFDM waveform or a CP-OFDM waveform) should be used by the UE 200 to transmit the msg3. The UE 200 obtains the transmission waveform used by the UE 200 to transmit the msg3 and/or its subsequent PUSCH by receiving the 1-bit information field configured in the uplink scheduling grant (UL-grant) of the MAC RAR by the base station 100. For example, if the received information field is "1", it is indicated that the UE 200 needs to transmit a msg3 and/or its subsequent PUSCH by using a DFT-S-OFDM waveform; and if the received information field is "0", it is indicated that the UE 200 needs to transmit a msg3 and/or its subsequent PUSCH by using a CP-OFDM waveform.

Alternatively, the UE 200 can obtain the transmission waveform used by the UE 200 to transmit a msg3 and/or its subsequent PUSCH by receiving the 1-bit information field configured in the message header (or the message sub-header) of the random access response by the base station 100. For example, if the received information field is "1", it is indicated that the UE 200 needs to transmit a msg3 and/or its subsequent PUSCH by using a DFT-S-OFDM waveform; and if the received information field is "0", it is indicated that the UE 200 needs to transmit a msg3 and/or its subsequent PUSCH by using a CP-OFDM waveform.

After the UE 200 enters the RRC connected state, the UE 200 can receive, through dedicated RRC signaling, reconfiguration information of the base station 100 for an uplink transmission waveform of the UE 200, so as to obtain a transmission waveform needed to be used by the UE 200 to send a PUSCH.

Alternatively, the UE 200 can obtain, only through a MAC RAR, the configuration information of the transmission waveform for transmitting the random access message 3 (msg3) and/or all of its subsequent PUSCHs configured by the base station 100 for the UE 200, rather than obtaining the reconfiguration information of the transmission waveform of the UE 200 for the PUSCH through the RRC signaling dedicated to the UE 200 after the UE 200 enters the RRC connected state.

Alternatively, the UE 200 can be predefined (or defined) to transmit the msg3 and/or its subsequent PUSCH by using a fixed transmission waveform before entering the RRC connected state. For example, the UE 200 is predefined to transmit the msg3 and/or its subsequent PUSCH by using only the DFT-SOFDM waveform before entering the RRC connected state; and the UE 200 can obtain the reconfiguration information of the transmission waveform of the UE 200 for the PUSCH through the RRC signaling dedicated to the UE 200 after the UE 200 enters the RRC connected state.

Embodiment 3

In this embodiment, the transmission waveform of the UE 200 for the msg3 and/or its subsequent PUSCH is selected by the UE 200 and informed to the base station 100 through a preamble of the msg1.

As indicated above, the UE 200 needs to perform a random access process when switching from the idle state to the RRC connected state. The random access process mainly consists of a message 1 (msg1), a message 2 (msg2), a message 3 (msg3), and a message 4 (msg4). The msg1 is a preamble for the UE 200 to transmit random access on an uplink random access channel; the msg2 is a random access response message transmitted by the base station 100 on a downlink; and the msg3 is the first uplink transmission of the UE 200 on an uplink scheduled by the base station 100, the msg3 being borne by a PUSCH. The msg4 is a message transmitted by the base station 100 on a downlink for solving a conflict problem between different UEs 200 during the random access process.

As can be seen from the above, the msg3 is the first uplink transmission of the UE 200 scheduled by the base station 100 in a process of switching from the idle state to the RRC connected state. Before receiving the msg3, the base station 100 needs to know a transmission waveform (e.g., a DFT-S-OFDM waveform or a CP-OFDM waveform) used by the UE 200 to transmit a msg3. The UE 200 can inform, through the preamble of the msg1, the base station 100 of the transmission waveform used by the UE 200 to transmit the msg3 and/or the subsequent PUSCH. For example, in the standard, a preamble can be divided into 2 preamble groups. Herein, one preamble group (group 1) is used to indicate that the UE 200 is to transmit the msg3 and/or the subsequent PUSCH by using the DFT-S-OFDM waveform. The other preamble group (group 2) is used to indicate that the UE 200 is to transmit the msg3 and/or the subsequent PUSCH by using the CP-OFDM waveform. If the UE 200 intends to transmit the msg3 and/or the subsequent PUSCH by using the DFT-S-OFDM waveform, then the UE 200 randomly selects a preamble from group 1 to transmit the msg1; and if the UE 200 intends to transmit the msg3 and/or the subsequent PUSCH by using the CP-OFDM waveform, then the UE 200 randomly selects a preamble from group 2 to transmit the msg1.

After the UE 200 enters the RRC connected state, the base station 100 can reconfigure the uplink transmission waveform of the UE 200 through the RRC signaling dedicated to the UE 200 according to the channel condition of the UE 200 and/or the network traffic and/or other factors affecting the uplink transmission waveform of the UE 200.

Alternatively, the UE 200 can select, only through a preamble, the transmission waveform used for transmitting the random access message 3 (msg3) and/or all of the subsequent PUSCHs, rather than reconfiguring the transmission waveform of the UE 200 for the PUSCH through the base station 100 by the RRC signaling dedicated to the UE 200 after the UE 200 enters the RRC connected state.

The base station 100 obtains information of the transmission waveform of the UE 200 for the msg3 and/or its subsequent PUSCH by detecting the preamble of the msg1. The PUSCH refers to a physical uplink shared channel in LTE/LTE-A specifications, or a physical uplink channel for bearing uplink data and/or signaling of the UE 200 as defined by NR.

The UE 200 needs to perform a random access process when switching from the idle state to the RRC connected state. The random access mainly consists of a message 1 (msg1), a message 2 (msg2), a message 3 (msg3), and a message 4 (msg4). The msg1 is a preamble for the UE 200 to transmit random access on an uplink random access channel; the msg2 is a random access response message transmitted by the base station 100 on a downlink; and the msg3 is the first uplink transmission of the UE 200 on an uplink scheduled by the base station 100, the msg3 being borne by a PUSCH. The msg4 is a message transmitted by the base station 100 on a downlink for solving a conflict problem between different UEs 200 during the random access process.

As can be seen from the above, the msg3 is the first uplink transmission of the UE 200 scheduled by the base station 100 in the process of switching from the idle state to the RRC connected state. Before receiving the msg3, the base station 100 needs to know a transmission waveform (e.g., a DFT-S-OFDM waveform or a CP-OFDM waveform) used by the UE 200 to transmit a msg3. The base station 100 can obtain the information of the transmission waveform used by the UE 200 to transmit the msg3 and/or the subsequent PUSCH by detecting the preamble of the msg1. For example, in the standard, a preamble can be divided into 2 preamble groups. Herein, one preamble group (group 1) is used to indicate that the UE 200 is to transmit the msg3 and/or the subsequent PUSCH by using the DFT-S-OFDM waveform. The other preamble group (group 2) is used to indicate that the UE 200 is to transmit the msg3 and/or the subsequent PUSCH by using the CP-OFDM waveform. If the base station 100 detects in group 1 a preamble transmitted by the UE 200, then the base station 100 learns that the UE 200 is to transmit the msg3 and/or the subsequent PUSCH by using the DFT-S-OFDM waveform; and if the base station 100 detects in group 2 a preamble transmitted by the UE 200, then the base station 100 learns that the UE 200 is to transmit the msg3 and/or the subsequent PUSCH by using the CP-OFDM waveform.

After the UE 200 enters the RRC connected state, the UE 200 can obtain the reconfiguration information of the transmission waveform of the UE 200 for the PUSCH through the RRC signaling dedicated to the UE 200.

Alternatively, the base station 100 can obtain, only by detecting the preamble, the information of the transmission waveform used by the UE 200 to transmit the random access message 3 (msg3) and/or all of the subsequent PUSCHs, rather than reconfiguring the transmission waveform of the UE 200 for the PUSCH through the base station 100 by the RRC signaling dedicated to the UE 200 after the UE 200 enters the RRC connected state.

Embodiment 4

In this embodiment, a determination of an uplink transmission waveform of the UE 200 for unauthorized uplink transmission is mainly solved.

An unauthorized uplink transmission mode means that uplink data is transmitted directly by the UE 200 randomly selecting uplink transmission resources or using resources pre-configured by the base station 100 without requesting scheduling of the base station 100, The UE 200 even does not need to perform a random access process. This transmission mode generally applies to the transmission of small uplink data. That is, once the UE 200 needs to transmit uplink data and the data packet is less than a certain threshold, then the UE 200 will directly select uplink resources to transmit the uplink data without requesting scheduling of the base station 100.

The unauthorized uplink transmission mode is performed based on resource pools. Uplink transmission resource pools of the unauthorized uplink transmission mode can be contention-based resource pools or non-contention-based resource pools. Contention-based resource pools are used in such a way that the UE 200 randomly selects uplink transmission resources therefrom for the UE 200 to transmit uplink data, Non-contention-based resource pools are used in such a way that a base station pre-configures uplink resources therefrom for the UE 200 to transmit uplink data.

For the unauthorized uplink transmission mode, a transmission waveform adopted in uplink transmission of resources in a resource pool can be predefined based on the resource pool. For example, four resource pools: resource pool 1, resource pool 2, resource pool 3, and resource pool 4 are predefined. Resource pools 1 and 2 are contention-based resource pools; and resource pools 3 and 4 are non-contention-based resource pools, Resources in resource pools 1 and 3 are adopted in such a way that uplink data and/or signaling of the UE 200 is transmitted by using a DFT-S-OFDM waveform; and resources in resource pools 2 and 4 are adopted in such a way that uplink data and/or signaling of the UE 200 is transmitted by using a CP-OFDM waveform.

In this way, when the UE 200 intends to transmit uplink data and/or signaling by using a DFT-S-OFDM waveform, then the UE 200 randomly selects resources from resource pool 1 to transmit uplink data and/or signaling; and when the UE 200 intends to transmit uplink data and/or signaling by using a CP-OFDM waveform, then the UE 200 randomly selects resources from resource pool 2 to transmit uplink data and/or signaling. When the base station 100 wants the UE 200 to transmit uplink data and/or signaling by using a DFT-S-OFDM waveform, then the base station 100 pre-configures resources from resource pool 3 for the UE 200 to transmit uplink data and/or signaling; and when the base station 100 wants the UE 200 to transmit uplink data and/or signaling by using a CP-OFDM waveform, then the base station 100 pre-configures resources from resource pool 4 for the UE 200 to transmit uplink data and/or signaling.

When the base station 100 intends to receive uplink data and/or signaling of the UE 200 from resource pools 1 and 3, then uplink data and/or signaling transmitted by the UE 200 is received by using a DFT-S-OFDM waveform; and when the base station 100 intends to receive uplink data and/or signaling of the UE 200 from resource pools 2 and 4, then uplink data and/or signaling transmitted by the UE 200 is received by using a CP-OFDM waveform.

In unauthorized uplink transmission, if the UE 200 further transmits a preamble and/or uplink control signaling on different physical channels while transmitting uplink data, then uplink resource pools of the above-mentioned unauthorized uplink transmission can be preamble resource pools and/or uplink control signaling resource pools and/or uplink data resource pools.

It is noted that the above-described 4 resource pools are provided merely for the convenience of description. It will be appreciated by those skilled in the art that other number of resource pools can also be used to implement the technical solution of the present application.

Figure 3:
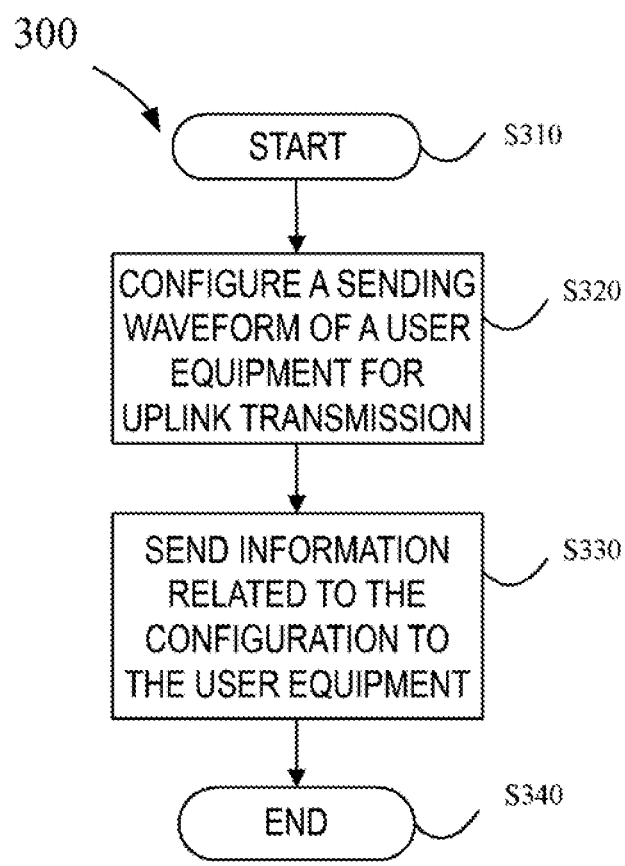
FIG. 3 is a flowchart of a method executed by a base station according to an embodiment of the present application.

FIG. 3 is a flowchart of a method executed by a base station according to an embodiment of the present application. As shown in FIG. 3, a method 300 starts at step S310.

At step S320, a transmission waveform of a UE 200 for uplink transmission is configured.

At step S330, information related to the configuration is transmitted to the UE.

In the present application, the configuration can be performed by using any of the following modes: physical layer signaling, an MAC RAR message, and RRC signaling. The transmission waveform can comprise a DFT-S-OFDM waveform and a CP-OFDM waveform or other uplink communication signal generation modes defined in other ways.

Alternatively, the transmission waveform of the UE 200 for uplink transmission can be configured through physical layer signaling, the physical layer signaling comprising DCI. The DCI can comprise information indicating a transmission waveform adopted in uplink transmission of the UE 200, or resource allocation information for uplink transmission of the UE 200.

Alternatively, the transmission waveform of the UE 200 for uplink transmission can be configured through a MAC RAR message, the MAC RAR message comprising an uplink scheduling grant indicating a transmission waveform adopted for a random access message 3 and/or a subsequent PUSCH. Further, the transmission waveform of the UE 200 for the PUSCH is reconfigured through RRC signaling dedicated to the UE 200 after the UE 200 enters an RRC connected state.

Alternatively, a transmission waveform used by the UE 200 to transmit the random access message 3 and/or the subsequent PUSCH can be predefined. Further, the transmission waveform of the UE 200 for the PUSCH is reconfigured through the RRC signaling dedicated to the UE 200 after the UE 200 enters the RRC connected state. Alternatively, a random access message 1 can be received from the UE 200, so as to determine the transmission waveform of the UE 200 for uplink transmission. Alternatively, a transmission waveform adopted in uplink transmission of resources in each resource pool for uplink transmission of the UE 200 can be predetermined.

Finally, the method 300 ends at step S340.

Figure 4:
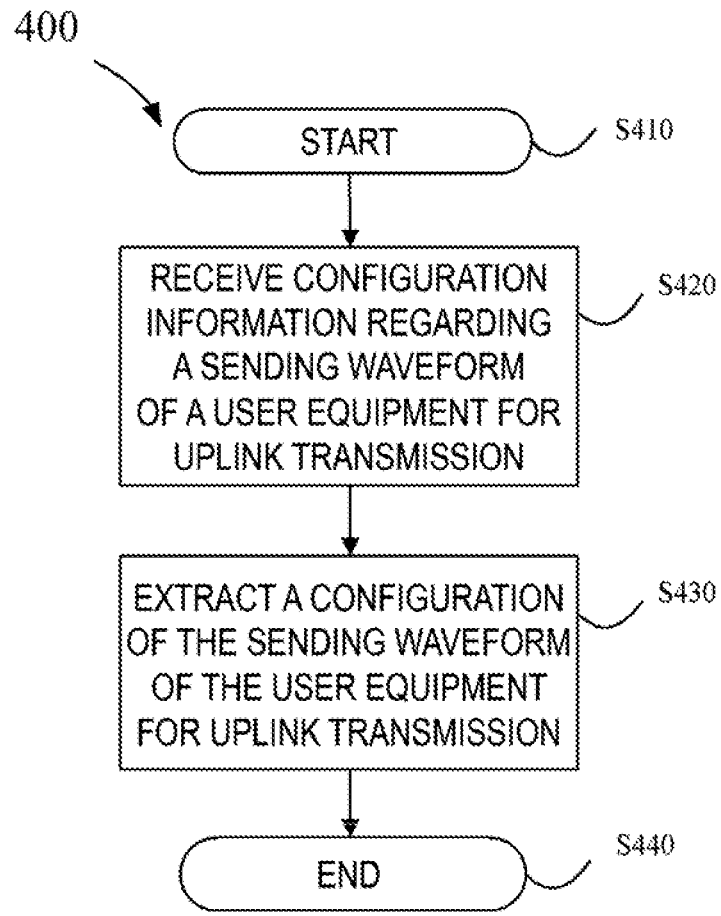
FIG. 4 is a flowchart of a method executed by a user equipment according to an embodiment of the present application.

FIG. 4 is a flowchart of a method executed by a user equipment according to an embodiment of the present application. As shown in FIG. 4, a method 400 starts at step S410.

At step S420, configuration information about a transmission waveform of a UE for uplink transmission is received from a base station.

At step S430, a configuration of the transmission waveform of the UE for uplink transmission is extracted from the received information.

In the present application, the configuration can be performed by using any of the following modes: physical layer signaling, an MAC RAR message, and RRC signaling. The transmission waveform can comprise a DFT-S-OFDM waveform and a CP-OFDM waveform or other uplink communication signal generation modes defined in other ways.

Alternatively, the transmission waveform of the UE 200 for uplink transmission can be configured through physical layer signaling, the physical layer signaling comprising DCI. The DCI can comprise information indicating a transmission waveform adopted in uplink transmission of the UE 200, or resource allocation information for uplink transmission of the UE 200.

Alternatively, the transmission waveform of the UE 200 for uplink transmission can be configured through a MAC RAR message, the MAC RAR message comprising an uplink scheduling grant indicating a transmission waveform adopted for a random access message 3 and/or a subsequent PUSCH. Further, the transmission waveform of the UE 200 for the PUSCH is reconfigured through RRC signaling dedicated to the UE 200 after the UE 200 enters an RRC connected state.

Alternatively, the transmission waveform used by the UE 200 to transmit the random access message 3 and/or the subsequent PUSCH can be predefined. Further, the transmission waveform of the UE 200 for the PUSCH is reconfigured through the RRC signaling dedicated to the UE 200 after the UE 200 enters the RRC connected state. Alternatively, the UE 200 can transmit a random access message 1 to the base station 100, so that the base station 100 can determine the transmission waveform of the UE 200 for uplink transmission according to the received random access message 1. Alternatively, a transmission waveform adopted in uplink transmission of resources in each resource pool for uplink transmission of the UE 200 can be predetermined.

Finally, the method 400 ends at step S440.

Figure 5:
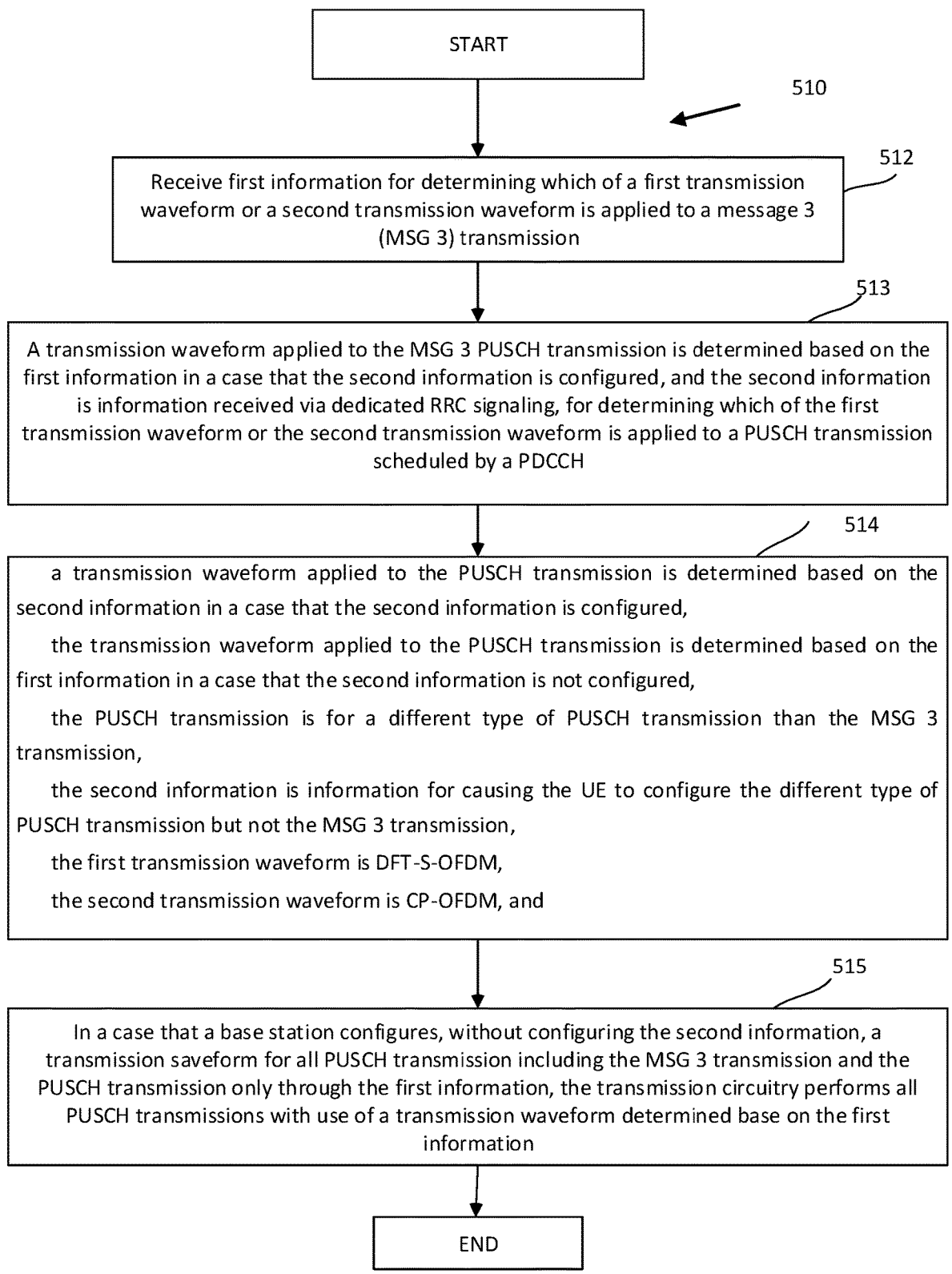
FIG. 5 is a flowchart of a method of receiving first information.

FIG. 5 is a flowchart of a method of receiving first information. As shown in FIG. 5, a method 510 starts at step 512.

At step 512, first information is received to determine which of a first transmission waveform or a second transmission waveform is applied to a message (MSG 3) transmission.

At step 513, a transmission waveform applied to the MSG 3 PUSCH transmission is determined based on the first information in a case that second information is configured, and the second information is information received via dedicated RRC signaling, for determining which of the first transmission waveform or the second transmission waveform is applied to a PUSCH transmission scheduled by a PDCCH;

At step 514, a transmission waveform applied to the PUSCH transmission is determined based on the second information in a case that the second information is configured; the transmission waveform applied to the second PUSCH transmission is determined based on the first information in a case that the second information is not configured; the PUSCH transmission is for a different type of PUSCH transmission than the MSG 3 transmission; the second information is information for causing the UE to configure the different type of PUSCH transmission but not the MSG 3 transmission; the first transmission waveform is DFT-S-OFDM; the second transmission waveform is CP-OFDM;

At step 515, in a case that a base station configures, without configuring the second information, a transmission waveform for all PUSCH transmissions including the MSG 3 transmission and the PUSCH transmission only through the first information, the transmission circuitry performs all PUSCH transmissions with use of a transmission waveform determined based on the first information.

FIG. 6 is a flowchart of a method of transmitting first information. As shown in FIG. 6 a method 620 starts at step 622.

At step 622, first information is transmitted to determine which of a first transmission waveform or a second transmission waveform is applied to a message (MSG 3) transmission.

At step 623, the MSG 3 transmitted by a user equipment (UE) which performs the MSG 3 transmission is received.

At step 624, a transmission waveform applied to the MSG 3 transmission is determined based on the first information in a case that second information is configured, and the second information is information transmitted via dedicated RRC signaling, for determining which of the first transmission waveform or the second transmission waveform is applied to a PUSCH transmission scheduled by a PDCCH;

At step 625, a transmission waveform applied to the PUSCH transmission is determined based on the second information in a case that the second information is configured; the transmission waveform applied to the PUSCH transmission is determined based on the first information in a case that the second information is not configured; the PUSCH transmission is for a different type of PUSCH transmission than the MSG 3 transmission, the second information is information for causing the UE to configure the different type of PUSCH transmission but not the MSG 3 transmission; the first transmission waveform is DFT-S-OFDM; the second transmission waveform is CP-OFDM;

At step 625, in a case that a base station configures, without configuring the second information, a transmission waveform for all PUSCH transmissions including the MSG 3 transmission and the PUSCH transmission only through the first information, the base station receives the MSG 3 and the PUSCH transmitted by the UE which performs the all PUSCH transmissions with use of a transmission waveform determined based on the first information.

The methods and related devices according to the present application have been described above in conjunction with the preferred embodiments. It should be understood by those skilled in the art that the methods shown above are only exemplary. The method according to the present application is not limited to steps or sequences shown above. The network node and user equipment shown above may include more modules; for example, the network node and user equipment may further include modules that can be developed or developed in the future to be applied to a base station or UE, and the like. Various identifiers shown above are only exemplary, and are not meant for limiting the present invention. The present application is not limited to specific information elements serving as examples of these identifiers. Those skilled in the art can make various alterations and modifications according to the teachings of the illustrated embodiments.

It should be understood that the above-described embodiments of the present application may be implemented through software, hardware, or a combination of software and hardware. For example, various components of the base station and user equipment in the above embodiments can be implemented through multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments of the present application disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present application. The computer program logic enables a processor to perform the operations (methods) described in the embodiments of the present application when the product is executed on at least one processor of a computing system. Such an arrangement of the present application is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared databases and so on in one or more modules. Software or firmware or such configuration may be installed on a computing device such that one or more processors in the computing device perform the technical solutions described in the embodiments of the present application.

In addition, each functional module or each feature of the base station device and the terminal device used in each of the above embodiments may be implemented or executed by a circuit, which is usually one or more integrated circuits. Circuits designed to execute various functions described in this description may include general purpose processors, digital signal processors (DSPs), application specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges due to advances in semiconductor technology, the present application may also use integrated circuits obtained using this advanced technology.

Although the present application has been shown in connection with the preferred embodiments of the present application, it will be understood by those skilled in the art that various modifications, substitutions and alterations may be made to the present application without departing from the spirit and scope of the present application. Accordingly, the present application should not be defined by the above-described embodiments, but should be defined by the appended claims and their equivalents.

The program running on the device according to the present application may be a program that enables the computer to implement the functions of the embodiments of the present application by controlling the central processing unit (CPU). The program or information processed by the program can be stored temporarily in volatile memory random access memory RAM), hard disk drive (HDD), non-volatile memory (e.g., flash memory), or other memory systems.

The program for implementing the functions of the embodiments of the present application may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of advances in semiconductor technology, the present application may also be implemented using these new integrated circuit technologies.

The embodiments of the present application have been described in detail above with reference to the accompanying drawings. However, the specific structures are not limited to the above embodiments, and the present application also includes any design modifications that do not depart from the main idea of the present application. In addition, various modifications can be made to the present application within the scope of the claims, and embodiments resulting from the appropriate combination of the technical means disclosed in different embodiments are also included within the technical scope of the present application. In addition, components with the same effect described in the above embodiments may be replaced with one another.

The invention claimed is:

1. A user equipment (UE) comprising:
reception circuitry configured to receive first information for determining which of a first transmission waveform or a second transmission waveform is applied to a random access message 3 (MSG 3) transmission and configured to receive second information, via dedicated radio resource control (RRC) signaling, for determining which of the first transmission waveform or the second transmission waveform is applied to a subsequent physical uplink shared channel (PUSCH) transmission scheduled by a physical downlink control channel (PDCCH); and
transmission circuitry configured to perform the MSG 3 transmission and the subsequent PUSCH transmission, wherein
a transmission waveform applied to the MSG 3 transmission is determined based on the first information in a case that second information is configured,
a transmission waveform applied to the subsequent PUSCH transmission is determined based on the second information in a case that the second information is configured,
the transmission waveform applied to the subsequent PUSCH transmission is determined based on the first information in a case that the second information is not configured,
the subsequent PUSCH transmission is a different type of PUSCH transmission than the MSG 3 transmission,
the second information is information for causing the UE to configure the different type of PUSCH transmission but not the MSG 3 transmission,
the first transmission waveform is DFT-S-OFDM,
the second transmission waveform is CP-OFDM, and
in a case that a base station configures, without configuring the second information, a transmission waveform for all PUSCH transmissions including the MSG 3 transmission and the subsequent PUSCH transmission only through the first information, the transmission circuitry performs the all PUSCH transmissions with use of a transmission waveform determined based on the first information.

2. A method for a user equipment (UE), the method comprising:

receiving first information for determining which of a first transmission waveform or a second transmission waveform is applied to a random access message 3 (MSG 3) transmission, and performing the MSG 3 transmission and a subsequent PUSCH transmission, wherein a transmission waveform applied to the MSG 3 transmission is determined based on the first information in a case that second information is configured, and the second information is information received via dedicated RRC signaling, for determining which of the first transmission waveform or the second transmission waveform is applied to the subsequent PUSCH transmission scheduled by a PDCCH, a transmission waveform applied to the subsequent PUSCH transmission is determined based on the second information in a case that the second information is configured, the transmission waveform applied to the subsequent PUSCH transmission is determined based on the first information in a case that the second information is not configured, the subsequent PUSCH transmission is a different type of PUSCH transmission than the MSG 3 transmission, the second information is information for causing the UE to configure the different type of PUSCH transmission but not the MSG 3 transmission, the first transmission waveform is DFT-S-OFDM, the second transmission waveform is CP-OFDM, and in a case that a base station configures, without configuring the second information, a transmission waveform for all PUSCH transmissions including the MSG 3 transmission and the subsequent PUSCH transmission only through the first information, the transmission circuitry performs the all PUSCH transmissions with use of a transmission waveform determined based on the first information.

3. A base station comprising:

transmission circuitry configured to transmit first information for determining which of a first transmission waveform or a second transmission waveform is applied by a user equipment (UE) to a random access message 3 (MSG 3) transmission, and configured to transmit second information, via dedicated RRC signaling, for determining which of the first transmission waveform or the second transmission waveform is applied by the UE to a subsequent PUSCH transmission scheduled by a PDCCH; and reception circuitry configured to:

receive the MSG 3 transmission with a transmission waveform indicated by the first information in a case that second information is transmitted, receive the subsequent PUSCH transmission with a transmission waveform indicated by the second information in a case that the second information is transmitted, receive the subsequent PUSCH transmission with a transmission waveform indicated by the first information in a case that the second information is not transmitted, the subsequent PUSCH transmission is a different type of PUSCH transmission than the MSG 3 transmission, the second information is information for causing the UE to configure the different type of PUSCH transmission but not the MSG 3 transmission, the first transmission waveform is DFT-S-OFDM, the second transmission waveform is CP-OFDM, and in a case that a base station transmits, without transmitting the second information, a transmission waveform for all PUSCH transmissions including the MSG 3 transmission and the subsequent PUSCH transmission only through the first information, the reception circuitry receives the all PUSCH transmissions with use of a transmission waveform indicated by the first information.

4. A method for a base station, the method comprising:

transmitting first information for determining which of a first transmission waveform or a second transmission waveform is applied to a random access message 3 (MSG 3) transmission, and receiving the MSG 3 transmission and a subsequent PUSCH transmission from a UE, wherein a transmission waveform applied to the MSG 3 transmission is determined based on the first information in a case that second information is configured, and the second information is information transmitted via dedicated RRC signaling, for determining which of the first transmission waveform or the second transmission waveform is applied to the subsequent PUSCH transmission scheduled by a PDCCH, a transmission waveform applied to the subsequent PUSCH transmission is determined based on the second information in a case that the second information is configured, the transmission waveform applied to the subsequent PUSCH transmission is determined based on the first information in a case that the second information is not configured, the subsequent PUSCH transmission is a different type of PUSCH transmission than the MSG 3 transmission, the second information is information for causing the UE to configure the different type of PUSCH transmission but not the MSG 3 transmission, the first transmission waveform is DFT-S-OFDM, the second transmission waveform is CP-OFDM, and in a case that the base station transmits, without transmitting the second information, a transmission waveform for all PUSCH transmissions including the MSG 3 transmission and the subsequent PUSCH transmission only through the first information, the base station receives the all PUSCH transmissions with use of a transmission waveform determined based on the first information.

* * * * *